(12) United States Patent
Luo et al.

(10) Patent No.: US 9,184,847 B2
(45) Date of Patent: Nov. 10, 2015

(54) DYNAMIC BANDWIDTH ASSIGNMENT IN HYBRID ACCESS NETWORK WITH PASSIVE OPTICAL NETWORK AND ANOTHER MEDIUM

(71) Applicant: Futurewei Technologies, Inc., Plano, TX (US)

(72) Inventors: Yuanqiu Luo, Canbury, NJ (US); Frank J. Effenberger, Colts Neck, NJ (US); Meng Sui, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 253 days.

(21) Appl. No.: 13/896,323

(22) Filed: May 17, 2013

(65) Prior Publication Data

US 2014/0186039 A1 Jul. 3, 2014

Related U.S. Application Data

(60) Provisional application No. 61/647,816, filed on May 16, 2012.

(51) Int. Cl.
*H04B 10/00* (2013.01)
*H04B 10/27* (2013.01)
(Continued)

(52) U.S. Cl.
CPC .............. *H04B 10/27* (2013.01); *H04L 12/287* (2013.01); *H04L 12/2861* (2013.01); *H04Q 11/0067* (2013.01); *H04Q 11/0071* (2013.01);
(Continued)

(58) Field of Classification Search
CPC . H04L 12/6418; H04L 12/66; H04L 41/0816; H04L 47/15; H04L 47/215; H04L 47/22; H04L 47/2441; H04L 47/245; H04L 47/564; H04L 47/60; H04L 63/0876; H04L 69/08; H04L 12/00; H04L 12/10; H04L 12/12; H04L 12/185; H04L 12/1868
See application file for complete search history.

(56) References Cited

U.S. PATENT DOCUMENTS 6,151,148 A * 11/2000 Harano .......................... 398/30
2007/0041384 A1 * 2/2007 Das et al. ................... 370/395.4
(Continued)

OTHER PUBLICATIONS

Mukherjee, B. (Mar. 2012). EPoC Architecture, MPCP and DBA. In IEEE EPoC PHY Study Group Meeting. Waikoloa, HI, USA. Retrieved from the Internet: <URL:http://www.ieee802.org/3/epoc/public/mar12/mukherjee_01_0312.pdf.>.*
(Continued)

*Primary Examiner* — Danny Leung
(74) *Attorney, Agent, or Firm* — Conley Rose, P.C.; Grant Rodolph; Jonathan K. Polk

(57) ABSTRACT

An optical line terminal (OLT) configured to receive transmission requests from a plurality of both network elements (NE) and customer premises equipment (CPE), allocate a timeslot to each NE for transmission on an optical distribution network (ODN), and a timeslot to each CPE for transmission on an electrical distribution network (EDN), wherein each NE intermediates between the OLT and the CPEs. Included is a NE configured to transmit a timeslot to a CPE for transmission on an EDN allocated by an OLT, receive data frames from the CPE during the timeslot, and forward the data frames to the OLT without rescheduling. Also included is a method comprising sending a transmission request to an OLT, receiving a timeslot from the OLT for transmission on an EDN in response, transmitting data frames to a NE during the timeslot, wherein the NE forwards the data frames to the OLT without rescheduling.

19 Claims, 5 Drawing Sheets

(51) Int. Cl.
*H04L 12/28* (2006.01)
*H04Q 11/00* (2006.01)

(52) U.S. Cl.
CPC ............ *H04Q2011/0064* (2013.01); *H04Q 2011/0079* (2013.01); *H04Q 2011/0088* (2013.01)

(56) References Cited

U.S. PATENT DOCUMENTS

| | | | |
|---|---|---|---|
| 2009/0304385 A1* | 12/2009 | Khermosh | 398/58 |
| 2011/0058813 A1* | 3/2011 | Boyd et al. | 398/68 |
| 2013/0142515 A1* | 6/2013 | Chen et al. | 398/67 |
| 2013/0177314 A1* | 7/2013 | Mizuguchi et al. | 398/66 |
| 2013/0236177 A1* | 9/2013 | Fang et al. | 398/66 |
| 2013/0322882 A1* | 12/2013 | Fang et al. | 398/67 |
| 2014/0133858 A1* | 5/2014 | Fang et al. | 398/66 |
| 2014/0178076 A1* | 6/2014 | Fang et al. | 398/98 |
| 2014/0186039 A1* | 7/2014 | Luo et al. | 398/66 |

OTHER PUBLICATIONS

Foreign Communication From a Counterpart Application, PCT Application No. PCT/US2013/041477, International Search Report dated Oct. 9, 2013, 5 pages.
Foreign Communication From a Counterpart Application, PCT Application No. PCT/US2013/041477, Written Opinion dated Oct. 9, 2013, 8 pages.
Bhaumik, P., et al., "EPON Protocol over Coax (EPoC): Round-Trip Time Aware Dynamic Bandwidth Allocation," XP-002712259, ONDM, Brest, France, 2013, pp. 287-292.
Mukherjee, PhD., B., "EPoC (Ethernet PON over Coax): Architecture, MPCP, and DBA," Department of Computer Science, IEEE, Mar. 2012, 21 pages.
"EPON vs. GPON, A Comparative Study," XP-002712354, Nov. 22, 2004, 17 pages.

* cited by examiner

DYNAMIC BANDWIDTH ASSIGNMENT IN HYBRID ACCESS NETWORK WITH PASSIVE OPTICAL NETWORK AND ANOTHER MEDIUM

CROSS-REFERENCE TO RELATED APPLICATIONS

The present application claims priority to U.S. Provisional Patent Application 61/647,816, filed May 16, 2012 by Yuanqiu Luo, et al., and entitled "Dynamic Bandwidth Assignment in Hybrid Access Network with Passive Optical Network and Another Medium," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office (CO), an optical distribution network (ODN), and a plurality of optical network units (ONUs) at the customer premises. Ethernet PON (EPON) is a PON standard developed by the Institute of Electrical and Electronics Engineers (IEEE) and specified in IEEE 802.3ah, which is incorporated herein by reference as if reproduced in its entirety. In EPON, a single fiber can be used for both the upstream and the downstream transmission with different wavelengths. The OLT implements an EPON Media Access Control (MAC) layer for transmission of Ethernet Frames. The Multi-Point Control Protocol (MPCP) performs the bandwidth assignment, bandwidth polling, auto-discovery, and ranging. Ethernet frames are broadcast downstream based on the Logical Link Identifier (LLID) embedded in the preamble frame. Upstream bandwidth is assigned based on the exchange of Gate and Report messages between an OLT and an ONU.

Recently, hybrid access networks employing both EPON and other network types have attracted growing attention. For example, Ethernet over Coaxial (EoC) may be a generic name used to describe all technologies which can be used for transmission of Ethernet frames over a unified optical-coaxial network. The name comes from the fact that, except for Data Over Cable Service Interface Specification (DOCSIS), all these technologies have in common that the Ethernet Frames are transmitted in the MAC layer. Different EoC technologies exist, including Multimedia over Coax Alliance (MoCA), G.hn (a common name for a home network technology family of standards developed under the International Telecommunication Union (ITU) and promoted by the HomeGrid Forum), HomePNA Alliance (HPNA), and Home Plug Audio/Visual (A/V), and they have been adapted to run the outdoor coaxial access from an ONU to an EoC Head End with connected Customer Premises Equipment (CPEs) located in the subscriber homes.

There is a rising demand which requires the use of EPON as an access system to interconnect with multiple coaxial cables to terminate the Coaxial Network Units (CNUs) located in the subscriber's home with an Ethernet PON over Coaxial (EPoC) architecture.

SUMMARY

In one embodiment, the disclosure includes an OLT configured to receive first frames from a plurality of network elements (NE) and second frames from a plurality of customer premises equipment (CPE), allocate a timeslot to each NE for transmission on an ODN, and a timeslot to each CPE for transmission on an electrical distribution network (EDN), wherein each NE intermediates between the OLT and the plurality of CPEs.

In another embodiment, the disclosure includes a CPE configured to receive a timeslot for transmission on an EDN allocated by an OLT, and transmit a plurality of data frames to a NE during the timeslot without the NE rescheduling transmission.

In another embodiment, the disclosure includes a method comprising receiving first frames from a plurality of NEs and second frames from a plurality of CPEs, allocating a timeslot to each NE for transmission on an ODN and a timeslot to each CPE for transmission on an EDN, wherein each NE intermediates between the OLT and the plurality of CPEs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
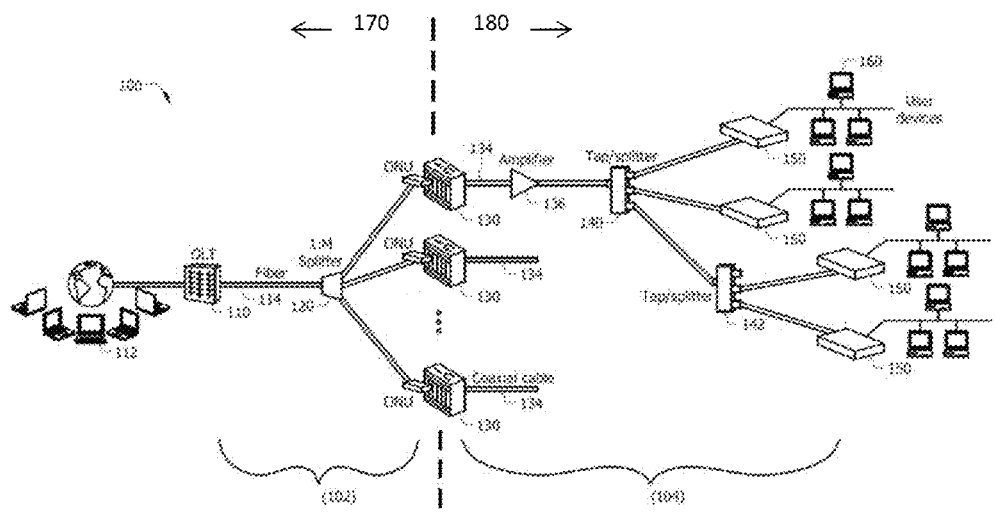
FIG. 1 illustrates an embodiment of a unified fiber-copper network comprising a fiber domain and a copper (electrical) domain.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system, apparatus, and/or method to centrally manage dynamic bandwidth allocations (DBAs) by an OLT across a hybrid access network comprising an optical portion and an electrical portion. Such centrally managed DBAs may be achieved by a OLT and a CPE communicating via MPCP messages encapsulated in the payload of a GEM or XGEM frames. GEM (or XGEM) ports may also be reserved for sending GEM (or XGEM) encapsulated MPCP messages. Such centrally managed DBAs may occur without any intervening network elements rescheduling transmissions. The OLT may calculate transmission delays between a specific CPE and corresponding intervening network element, compensate for such transmission delays in DBA assignments, and schedule intervening network element DBA assignments to correspond with the arrival of CPE transmissions. Also, intervening network element non-CPE transmissions DBA assignments may be scheduled so they do not interfere with CPE transmissions.

Network operators continue to deploy a growing number of fiber networks offering higher bit-rates to keep pace with an increasing network bandwidth demand. However, fiber networks may require higher deployment costs when compared to other access networks types (e.g. copper and wireless). Also, fiber network deployment costs may be currently disproportional to potential revenue earnable from actual market demand. Thus, connecting fiber networks to other access network types already deployed on a customer's premises offers an attractive interim solution until market demand supports investment costs for a fully fiber network. This may result in an access network that provides hybrid access via at least two types of transmission media. For example, a fiber feeder network (e.g. a PON) may couple an OLT located at a CO to a plurality of coaxial line terminals (CLTs), while a copper distribution network (e.g. digital subscriber line (DSL) or cable lines) may couple a CLT to a plurality of CPEs. The OLT may be configured to schedule upstream transmissions by allocating upstream bandwidth on the PON among the CLTs to avoid issues such as transmission collisions. A transmission collision may occur when two or more devices are attempting to simultaneously use the same transmission channel. The CLTs may similarly be configured to schedule upstream transmissions by allocating upstream bandwidth among the CPEs on the copper network. Thus, a hybrid access network comprising a fiber feeder network interfacing with a copper distribution network may result in complicated upstream bandwidth scheduling as data traverses both networks. This may be attributed to a lack of coordination between the OLT and CLTs when allocating upstream bandwidth in their respective networks.

FIG. 1 illustrates an embodiment of a unified fiber-copper network 100 comprising a fiber domain 170 and a copper (electrical) domain 180. The fiber domain 102 may essentially be a PON and the electrical domain 104 may be a coaxial cable network. The fiber domain 170 may comprise an OLT 110 and one or more ONUs 130 coupled to the OLT 110 via an ODN 102. The ODN 102 may comprise an optical line or fiber 114 and an optical splitter 120 that couples the OLT 110 to an ONU 130. Similarly, the electrical domain 180 may comprise one or more ONUs 130, each of which may be coupled to a plurality of CNUs 150 via an EDN 104. The EDN 104 may comprise coax cables 134, amplifiers 136 (only one shown as an example), and cable taps or splitters 140 and 142.

In the unified fiber-copper network 100, each ONU 130 and its corresponding CLT may be fused together into a single box. The ONU-CLT box may act as a single device, which may reside at the curb or basement of a house or an apartment building. The ONU-CLT box may form an interface between the fiber domain 170 and the electrical domain 180. Following convention in the art, unless otherwise noted, hereinafter a box including an ONU 130 and a CLT may simply be referred to as an ONU 130 that has CLT functionalities. It should be understood that the unified fiber-copper network 100 may comprise any number of ONUs 130 and corresponding CNUs 150 for each OLT 110. The components of the unified fiber-copper network 100 may be arranged as shown in FIG. 1 or any other suitable arrangement.

The fiber domain 170 may be a communication network that does not require any active components to distribute data between the OLT 110 and the ONUs 130. Instead, the fiber domain 170 may use the passive optical components in the ODN 102 to distribute data between the OLT 110 and the ONU 130. The optical fiber 114 may have any suitable transmission speed, such as 1 or 10 Gigabits per second (Gbps). Examples of suitable protocols that may be implemented in the fiber domain 170 include the asynchronous transfer mode PON (APON) and the broadband PON (BPON) defined by the ITU Telecommunication Standardization Sector (ITU-T) G.983 standard, Gigabit-capable PON (GPON) defined by the ITU-T G.984 standard, the EPON defined by the IEEE 802.3ah standard, and the wavelength division multiplexing (WDM) PON (WDM-PON), all of which are incorporated by reference as if reproduced in their entirety.

The OLT 110 may be any device configured to communicate with the CNUs 150 via the ONU 130. The OLT 110 may reside in a local exchange, which may be a CO. Further, the OLT 110 may couple or connect the unified fiber-copper network 100 to another network 112, which could be any type of network such as an Internet, synchronous optical network (SONET), or asynchronous transfer mode (ATM) backbone. For example, the OLT 110 may act as an intermediary between the ONUs 130 and the network 112. Specifically, the OLT 110 may forward data received from the network 112 to the ONUs 130, and forward data received from the ONUs 130 onto the network 112. Although the specific configuration of the OLT 110 may vary depending on the type of optical protocol implemented in the fiber domain 170, in an embodiment, the OLT 110 may comprise an optical transmitter and an optical receiver. When the network 112 is using a network protocol that is different from the protocol used in the fiber domain 170, the OLT 110 may comprise a converter that converts the protocol of the network 112 to the protocol of the fiber domain 170. The OLT converter may also convert the fiber domain 170 protocol into the network 112 protocol.

The ODN 102 between the OLT 110 and the ONUs 130 may be a data distribution system that may comprise optical fiber cables, couplers, splitters, distributors, and/or other equipment. In data transmission, Ethernet packets from the OLT 110 may pass through a 1×M passive splitter or a cascade of splitters and reach each of the ONUs 130, where M may denote a number of ONUs in the unified fiber-copper network 100. M may have any suitable value, such as 4, 8, or 16, and may be decided by an operator depending on factors like an optical power budget. Thus, packets may be broadcasted by the OLT 110 and selectively extracted by the ONUs 130. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 130. It should be noted that, if needed, the optical fiber cables may be replaced by any optical transmission media. In some embodiments, the ODN 102 may comprise one or more passive or active optical amplifiers. The ODN 102 may extend from the OLT 110 to the ONUs 130 in a branching configuration as shown in FIG. 1, but may be alternatively configured as determined by a person of ordinary skill in the art.

The ONUs 130 may be remotely coupled to the OLT 110. In some embodiments, one or more ONUs may be located within the OLT 110. In the downstream direction, each ONU 130 may be any device or component configured to receive downstream data from the OLT 110, process the downstream data, and transmit the processed downstream data to corresponding CNUs 150. The ONU 130 may convert the downstream data appropriately to transfer the data between the fiber domain 170 and the electrical domain 180. Although terms "upstream" and "downstream" may be used throughout to denote the locations of various network features relative to the OLT or similar unit, those skilled in the art will appreciate that the data flow on the network in the embodiments of the disclosure is bi-directional. Downstream data received by an ONU 130 may be in the form of optical signals, and downstream data transmitted by an ONU 130 may be in the form of electrical signals that may have a different logical structure as compared with the optical signals. As such, the ONU 130 may encapsulate or frame the data in the fiber domain 170 and the electrical domain 180 differently. In an embodiment, the ONU 130 includes a MAC layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the ONU 130 is transparent to the CNU 150 and OLT 110 in that the frames sent from the OLT 110 to the CNU 150 may be directly addressed to the CNU 150 (e.g. in the destination address), and vice-versa. As discussed further below, an identifier may be associated with each ONU 130, and the identifier may uniquely identify each ONU 130. As such, the ONU 130 intermediates between network domains, namely a fiber domain 170 and an electrical domain 180 in the embodiment of FIG. 1. Among the ONU's functions within a unified fiber-copper network 100 are initial registration of the CNUs in the network and scheduling of all the radio frequency (RF) channels of the copper (electrical) network.

The electrical domain 180 of the unified fiber-copper network 100 may be similar to any known electrical communication system. For example, the electrical domain 180 may also be a P2MP network. Downstream data from an ONU 130 may pass through amplifier(s) and a tap or splitter or a cascade of taps or splitters to reach one or more CNUs 150. In an embodiment, downstream data transmission from an ONU 130 to CNUs 150 may not be a broadcast; instead, a media access plan (MAP) may be used to allocate different subcarrier groups to different CNUs using orthogonal frequency-division multiple access. Thus, in some cases, downstream transmissions may be unicast from the OLT 110 to the CNUs 150.

The EDN between the ONUs 130 and the CNUs 150 may be a data distribution system that comprises electrical cables (e.g. coaxial cable and twisted wires), couplers, splitters, distributors, and/or other equipment. In an embodiment, the electrical cables, couplers, splitters, distributors, and/or other equipment are passive electrical components. Specifically, the electrical cables, couplers, splitters, distributors, and/or other equipment may be components that do not require any power to distribute data signals between the ONU 130 and the CNU 150. It should be noted that, if needed, the electrical cables may be replaced by any electrical transmission media. In some embodiments, the EDN 104 may comprise one or more active components, such as electrical amplifiers 136. Examples of suitable protocols that may be implemented in the electrical domain 180 include MoCA, G.hn, HPNA, and Home Plug A/V, all of which are incorporated by reference as if reproduced in their entirety. The EDN 104 may extend from each ONU 130 to its corresponding CNUs 150 in a branching configuration as shown in FIG. 1, but may be alternatively configured as determined by a person of ordinary skill in the art.

In an embodiment, each CNU 150 may be any device configured to communicate with the OLT 110, the ONU 130, and any subscriber device 160. Specifically, the CNUs 150 may act as an intermediary between the OLT 110 and the subscriber devices 160. For example, each port of the OLT 110 may serve 32, 64, 128, or 256 CNUs, and depending on the number of CNUs present in the unified fiber-copper network 100, a suitable number (e.g., 4, 8, or 16) of ONUs 130 may be deployed per OLT port. An exemplary distance between the OLT 110 and a ONU 130 may be in the range of 10 to 20 kilometers, and an exemplary distance between an ONU 130 and a CNU 150 may be in the range of 100 to 500 meters. Further, each CNU 130 may serve any suitable number (e.g., 3 or 4) of subscriber devices 160. For instance, the CNUs 150 may forward data received from the OLT 110 to the subscriber devices 160, and forward data received from the subscriber devices 160 to the OLT 110.

Although the specific configuration of the CNUs 150 may vary depending on the type of network 100, in an embodiment, a CNU 150 may comprise an electrical transmitter configured to send electrical signals to an ONU 130 and an electrical receiver configured to receive electrical signals from the ONU 130. Additionally, the CNU 150 may comprise a converter that converts the electrical signal into electrical signals for the subscriber devices 160, such as signals in an ATM protocol, and a second transmitter and/or receiver that may send and/or receive the electrical signals to the subscriber devices 160. In some embodiments, CNUs 150 and coaxial network terminals (CNTs) are similar, and thus the terms are used interchangeably herein. The CNUs 150 may typically be located at end-user locations, such as the customer premises, but may be located at other locations as well.

The subscriber devices 160 may be any devices configured to interface with a user or a user device. For example, the subscriber devices 160 may include desktop computers, laptop computers, tablets, mobile telephones, residential gateways, televisions, set-top boxes, and similar devices.

The disclosed method of dynamic bandwidth assignment in a hybrid access network is explained in the context of a hybrid fiber/copper access network for illustration purposes only. The disclosed method may equally apply to hybrid access network comprising a fiber feeder network coupled to any wireless or copper based distribution network.

Figure 2:
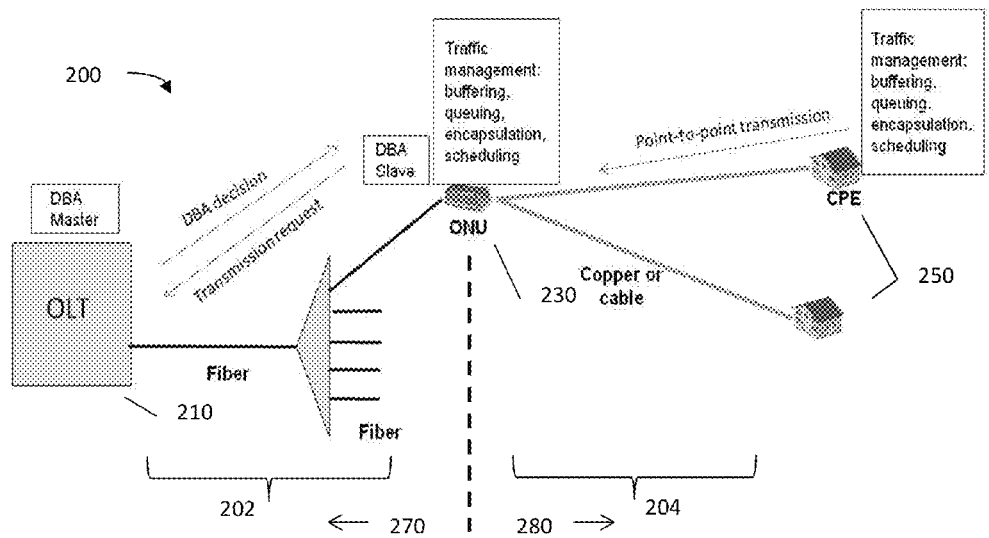
FIG. 2 is a diagram of an embodiment of a hybrid access network without centralized upstream transmission scheduling.

FIG. 2 is a diagram of an embodiment of a hybrid access network 200 (e.g. unified fiber-copper network 100) without centralized upstream transmission scheduling. Network 200 may comprise a fiber domain 270 and a copper domain 280 coupled via a plurality of ONUs 230. The fiber domain 270 may comprise an OLT 210 coupled to the ONUs 230 via an ODN 202, which may be similar to OLT 110, ONU 130, and ODN 102, respectively. The copper domain 280 may comprise the ONU 230 coupled to a plurality of CPEs 250 via an EDN 204, which may be similar to ONU 130, CNU 150, and EDN 104, respectively. In network 200, there may be no coordination between an OLT and an ONU in their respective upstream bandwidth allocation functions.

The fiber domain 270 may be configured in a P2MP architecture with the OLT 210 located at a CO coupled to the ONUs 230. In an embodiment, data may be exchanged between the OLT 210 and the ONUs 230 via the ODN 202 according to a PON protocol. For example, fiber domain 270 may exchange data according to a GPON protocol as specified by a ITU-T G.984.3 standard. In an embodiment, data may be exchanged through bit-stream based transmission, such as data packets transmitted by a time division multiple access (TDMA) method. The GPON protocol may comprise a GPON Transmission Convergence (GTC) layer that provides a plurality of functionalities, including MAC functionalities for data framing over upstream and downstream channels and a GEM for framing the data and status reporting signaling using DBA for upstream data. The GPON DBA protocol may enable the OLT 210 to dynamically share a common upstream channel of the ODN 202 among the plurality of ONUs 230. In fiber domain 270, the GPON DBA protocol may dynamically share a common upstream channel by allocating bandwidth in units defined by time.

The GPON DBA protocol may comprise an ONU ranging/registration process and an upstream DBA process. The GPON DBA protocol may be implemented as a master/slave configuration, wherein an OLT serves as a GPON DBA master over a plurality of ONUs (GPON DBA slaves). In the ONU ranging/registration process, an ONU joining a hybrid access network may be registered with the OLT and/or a transmission delay may be calculated between the OLT and the ONU. In an upstream DBA process, the OLT allocates upstream bandwidth by granting an ONU an interval of time (e.g. a timeslot) to transmit data on a common upstream channel.

The ONU ranging/registration process may comprise an OLT broadcasting a request for all currently registered ONUs to halt transmissions on the upstream channel. An OLT may then broadcast a request for all unregistered ONUs without an ONU identifier (ONU-ID) to transmit their serial number. An unregistered ONU may respond by transmitting its serial number after waiting for a random time to avoid transmission collisions. The OLT may assign the unregistered ONU an ONU-ID upon receipt of the serial number transmission. The OLT may transmit another request for all ONUs to halt transmissions on the upstream channel. The OLT may then sequentially transmit a ranging request to each registered ONU for a transmission delay measurement. The ONU specified in the ranging request may respond with a ranging transmission that may include the ONU's assigned ONU-ID. The OLT may then measure a round trip delay (RTD) for that ONU and calculate an equalization delay. The OLT may then transmit the calculated equalization delay to the ONU. The ONU may then offset subsequent upstream transmissions by the equalization delay to mitigate its transmission delay.

In an upstream GPON DBA process, an OLT 210 may broadcast a bandwidth map (BWmap) in the header of a downstream frame to a plurality of ONUs 230. The BWmap may be an array of allocation structures, wherein each entry in the array represents a single bandwidth allocation to a particular transmission container (T-CONT). Through the BWmap, the OLT 210 may send pointers that indicate a time at which the ONU 230 may begin and end its upstream transmission. A T-CONT may be a virtual upstream channel, which may serve as a unit of bandwidth allocation from OLT 210. A single T-CONT may be allocated to an ONU 230, a class of service (CoS), or a logical ONU. Furthermore, a single ONU 230 may have one or more T-CONTs allocated to it. Each allocation structure may identify a specific T-CONT assigned to a specific ONU, based upon prior upstream DBA process allocations. The ONU 230 may respond with a dynamic bandwidth report (DBRu) to OLT 210 indicating how many data packets are waiting in a T-CONT queue to be transmitted upstream. The OLT 210 may collect DBRus from all ONUs 230 and update the BWmap of a subsequent downstream frame according to a DBA algorithm. The ONU 230 may receive the subsequent downstream frame and transmit data over the common upstream channel during a timeslot assigned in the updated BWmap.

The copper domain 280 may also be configured in a P2MP architecture with an ONU 230 coupled to a plurality of CPEs 250 via an EDN 204. In an embodiment, data may be exchanged between an ONU 230 and a plurality of CPEs 250 via a copper domain 280 according to an EPoC protocol. For example, copper distribution network 280 may exchange data according to an EPoC protocol. In an embodiment, data may be exchanged through symbol based transmission, such as data packets transmitted by an orthogonal frequency division multiplexing (OFDM) method. In copper domain 280, an EPoC DBA protocol may dynamically share a common upstream channel by allocating bandwidth in units defined by frequency and time.

An EPoC DBA protocol may be implemented as a master/slave configuration, wherein an ONU 230 serves as an EPoC DBA master over a plurality of CPEs 250 (EPoC DBA slaves). Unlike in fiber domain 270, which may provide a frame-based transmission channel, copper domain 280 may provide a symbol-based transmission channel. Bandwidth allocation of a shared upstream channel among a plurality of CPEs 250 within copper domain 280 may be handled by an ONU 230. In copper domain 280, an ONU 230 may allocate upstream bandwidth by granting intervals of time (e.g. time slot assignments) and sub-carrier frequencies to each CPE 250 to transmit upstream data. In an embodiment, ONU 230 may grant time slot assignments and sub-carrier frequencies to each CPE 250 through a MPCP.

MPCP may comprise ONU 230 broadcasting a Gate message, which may provide for discovery of newly connected CPEs 250, continuous ranging, and dynamic bandwidth allocation. The payload of a Gate message may include a grant allocating a discovery window, e.g. a timeslot and a sub-carrier whereby a node, such as CPE 250, receiving the broadcast message and desiring to register with ONU 230 may transmit a registration message.

Each CPE 250, desiring to register with ONU 230, may respond with a registration request message (Register_Req) when the discovery window opens. Register_Req may comprise an LLID and may be sent after the expiry of a random delay to mitigate contentions between a plurality of CPEs 250 attempting to register with ONU 230. ONU 230 may respond with a registration message (Register), which may provide the CPE 250 with identification parameters.

Having received Register including LLID, a CPE 250 may now be identified using an assigned LLID. Thus, an ONU 230 may allocate a timeslot and sub-carrier for the CPE 250 to return a registration acknowledgement by sending a Gate message containing a timeslot and sub-carrier grant and the assigned LLID, for example in a preamble or other predetermined field in the Gate message. When the timeslot allocated in the Gate message opens, the CPE 250 may return a registration acknowledgement message (Register_Ack) with the assigned LLID to ONU 230, completing the registration of CPE 250. Further, CPE 250 may use the assigned LLID to recognize and/or filter messages broadcast by the ONU 230 and which are addressed to it or to one or more downstream nodes and/or subscriber devices.

Figure 3:
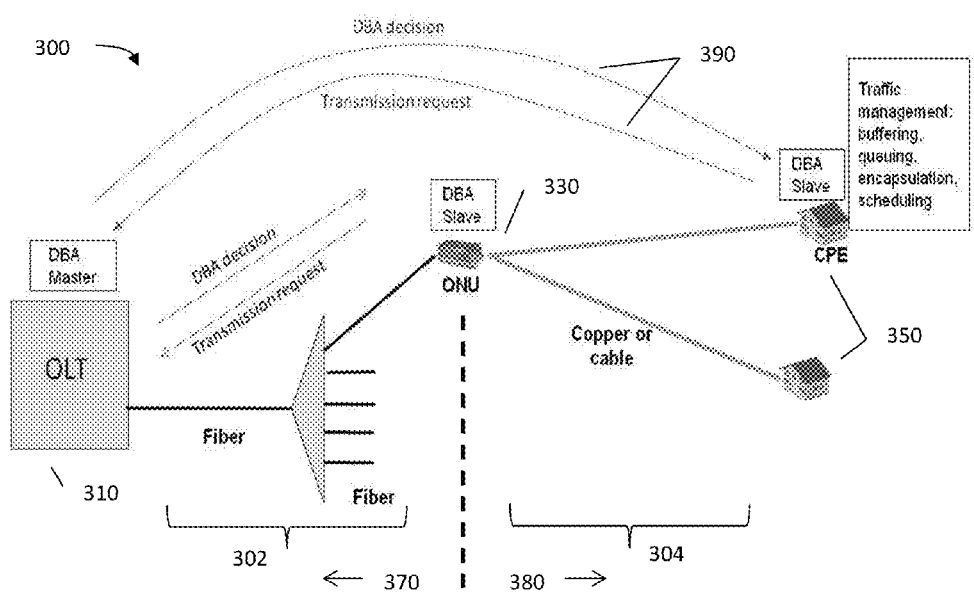
FIG. 3 is a diagram of an embodiment of a hybrid access network with centralized upstream transmission scheduling.

FIG. 3 is a diagram of an embodiment of a hybrid access network 300 (e.g. unified fiber-copper network 100) with centralized upstream transmission scheduling. Network 300 may comprise a fiber domain 370 and a copper domain 380 coupled via a plurality of ONUs 330. A fiber domain 370 may comprise an OLT 310 coupled to a plurality of ONUs 330 via an ODN 302, which may be similar to OLT 210, ONU 230, and ODN 202, respectively. A copper domain 380 may comprise an ONU 330 coupled to a plurality of CPEs 350 via an EDN 304, which may be similar to ONU 230, CNU 250, and EDN 204, respectively. In network 300, a DBA protocol extension may be implemented so that upstream transmissions from both a plurality of ONUs 330 and a plurality of CPEs 350 may be centrally managed by OLT 310. Thus, in network 300, OLT 310 may serve as DBA master over a plurality of ONUs 330 and a plurality of CPEs 350. In network 300, extra processing of upstream transmissions may be reduced through centralized upstream transmission scheduling over both the fiber domain 370 and the copper domain 380 using a DBA protocol extension method.

The DBA protocol extension method in network 300 may comprise a CPE-ONU delay estimation, a CPE transmission compensation, and a CPE-ONU timeslot coordination. In network 300, an OLT 310 may manage CPE upstream transmissions by sending timeslot allocations (e.g. BWmap or MPCP Gate messages) communicated through OLT-CPE signaling messages 390. CPE 350 may both receive the timeslot allocations from OLT 310 and report its transmission requirements to OLT 310 through OLT-CPE signaling messages 390. In an embodiment, OLT-CPE signaling messages 390 may be used to transmit BWmap or MPCP Gate/Report messages over copper domain 380. For example, a BWmap message may be encapsulated into an Ethernet operations, administration, and management (OAM) message so that a CPE 350 may parse the BWmap message via its local Ethernet OAM module. Alternatively, a MPCP Gate/Report message may be encapsulated into a GEM frame payload so that a CPE 350 may parse the MPCP Gate/Report message, which will be further discussed below, via a PON DBA module. A PON DBA module may be added to a CPE 350 so it may remove the GEM frame header to retrieve the MPCP Gate/Report message. Furthermore, a GEM port (or an XGEM port) may be reserved to transmit the MPCP GEM (or MPCP XGEM) messages. Thus, OLT-CPE signaling messages may permit OLT 310 and CPEs 350 to directly communicate, which may reduce and/or eliminate DBA messaging de-capsulation, re-encapsulation, and/or reprocessing by ONUs 330. Also, OLT-CPE signaling messages may reduce and/or eliminate traffic management overhead at ONUs 330. Therefore, ONUs 330 may be designed to be an upstream traffic forwarder, which may convert OLT-CPE signaling messages from an optical domain to a copper domain and vice-versa.

A CPE-ONU delay estimation may enable OLT 310 to estimate and/or measure a transmission delay between a CPE 350 and its corresponding ONU 330. CPE-ONU delay estimation may be accomplished during a CPE registration process by OLT 310 using OLT-CPE signaling messages 390. A CPE registration process in network 300 may be implemented by extending a GPON registration process (e.g. ONU ranging/registration process of network 200) from ONUs 330 to CPEs 350. Thus, in network 300 CPEs 350 may be treated as ONUs 330 by OLT 310 for registration purposes. For example, the CPE transmission delay may be estimated by accounting for the corresponding ONU's 330 transmission delay during registration. A CPE transmission compensation may be achieved by including a CPE-ONU delay estimation into a DBA algorithm. In network 300, OLT 310 may allocate timeslots using this modified DBA algorithm to avoid upstream transmission collisions in copper domain 380. A CPE-ONU timeslot coordination may enable OLT 310 to allocate timeslots to both ONUs 330 and CPEs 350 so that CPE upstream transmissions arrive at a corresponding ONU closely to the commencement of the ONU's allocated timeslot. Thus, ONUs 330 may not need to buffer and/or queue CPE 350 upstream transmission by implementing CPE-ONU timeslot coordination. In network 300, ONUs 330 may be configured as transmission containers to forward CPE upstream transmission to OLT 310 without rescheduling. Furthermore, if an ONU has a non-CPE upstream transmission to send, CPU-ONU timeslot coordination may enable OLT 310 to schedule non-CPE upstream transmissions to not conflict with CPE upstream transmissions.

Figure 4:
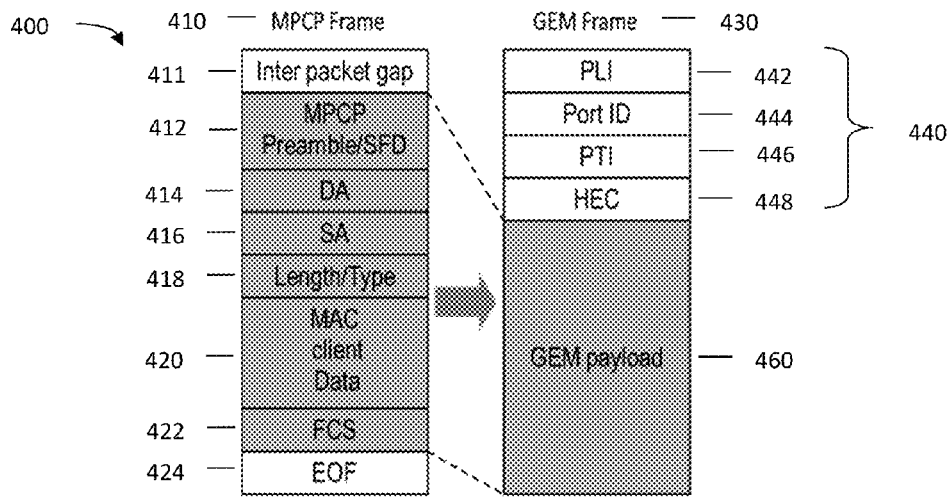
FIG. 4 illustrates an embodiment of a MPCP Gigabit-capable PON encapsulation method (GEM) message.

FIG. 4 illustrates an embodiment of an MPCP GEM message 400. An OLT (e.g. OLT 310) may communicate with a wireless or copper domain unit (e.g. CPE 350) via MPCP GEM message 400. MPCP GEM message 400 may comprise a MPCP frame 410 mapped into a payload 460 of a GEM frame 430.

A MPCP frame 410 may be preceded by an inter-packet gap (IPG) 411 and may comprise a MPCP preamble/start-of-frame delimiter (SFD) field 412, destination address (DA) field 414, a source address (SA) field 416, a length/type field 418, a MAC client data field 420, and a frame check sequence (FCS) field 422. An end-of-frame (EOF) field 424 may be at the end of MPCP frame 410. The MPCP preamble/SFD field 412 may be used for frame synchronization, channel estimation, and the SFD portion may identify the end of the MPCP preamble portion. The DA field 414 may comprise a network address, such as a MAC address, for a destination node, which may be intended to receive the data, e.g. the OLT or one of the CPEs. The SA field 416 may comprise a network address for a source node, which may originate the MPCP message 400 (e.g. OLT 310). The length/type field 418 may be used to indicate that the message's length and type corresponds to a MAC control message. The MAC client data field 420 may comprise the MAC control data transported between the OLT and a CPE (e.g. OLT 310 and CPE 350, respectively). The FCS field 422 may be used for error detection and correction, such as a Cyclic Redundancy Check (CRC) or other checksum.

A GEM frame 430 may comprise a header 440 and a payload 460. The header 440 may comprise a Payload Length Indicator (PLI) 442, a Port identifier (Port ID) field 444, a Payload Type Indicator (PTI) field 446, and a Header Error Control (HEC) field 448. The PLI field 442 may indicate the length of the payload 460 in bytes. The PLI field 442 may also indicate the beginning of the payload 450. The PortID field 444 may provide a plurality of unique traffic identifiers. The traffic identifiers may correspond to a plurality of data flows, which may be multiplexed. The PTI field 446 may indicate the content type of the payload 460. The HEC field 448 may provide error detection and correction functions. The payload 460 may comprise the payload data transported between an OLT and a CPE (e.g. OLT 310 and CPE 350, respectively).

Figure 5:
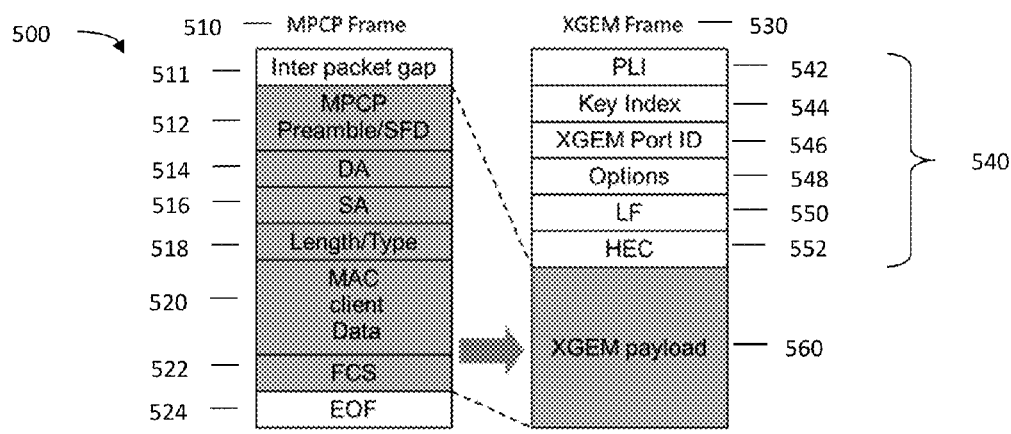
FIG. 5 illustrates an embodiment of a MPCP 10 Gigabit-capable PON encapsulation method (XGEM) message.

FIG. 5 illustrates an embodiment of a MPCP XGEM message 500. An OLT (e.g. OLT 310) may communicate with a wireless or copper domain unit (e.g. CPE 350) via MPCP XGEM message 500. MPCP XGEM message 500 may comprise a MPCP frame 510 mapped into a payload 560 of an XGEM frame 530. MPCP frame 510 may be substantially similar to MPCP frame 410.

An XGEM frame 530 may comprise a header 540 and a payload 560. The header 540 may comprise a PLI field 542, a Port ID field 546, and a HEC field 552, which may be substantially similar to PLI field 442, Port ID field 444, and HEC field 448, respectively. The header 540 may further comprise a key index field 544, an options field 548, and a last fragment indication (LF) field 550. The key index field 544 may be used to indicate which key, if any, may have been used to encrypt the current XGEM frame 530. The Options field 548 may be used to pad the XGEM frame 530 and/or provide optional flags. The LF field 550 may signal a last fragment of a service data unit.

Figure 6:
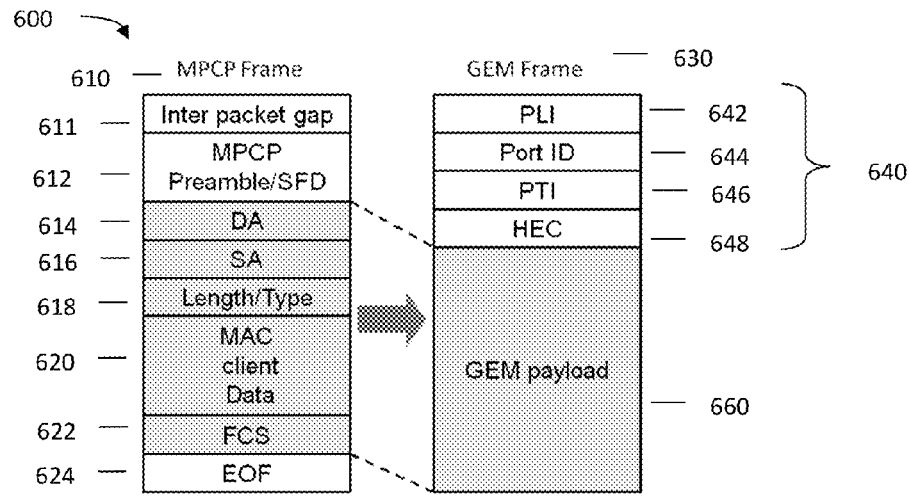
FIG. 6 illustrates an embodiment of a MPCP GEM message.

FIG. 6 illustrates an embodiment of a MPCP GEM message 600. An OLT (e.g. OLT 310) may communicate with a wireless or copper domain unit (e.g. CPE 350) via MPCP GEM message 600. MPCP GEM message 600 may comprise a MPCP frame 610 mapped into a payload 660 of a GEM frame 630. MPCP frame 610 may be substantially similar to MPCP frame 410. Unlike MPCP GEM message 400, MPCP GEM message 600 may omit MPCP preamble/start-of-frame delimiter (SFD) field 612 from being mapped into GEM frame 630.

Figure 7:
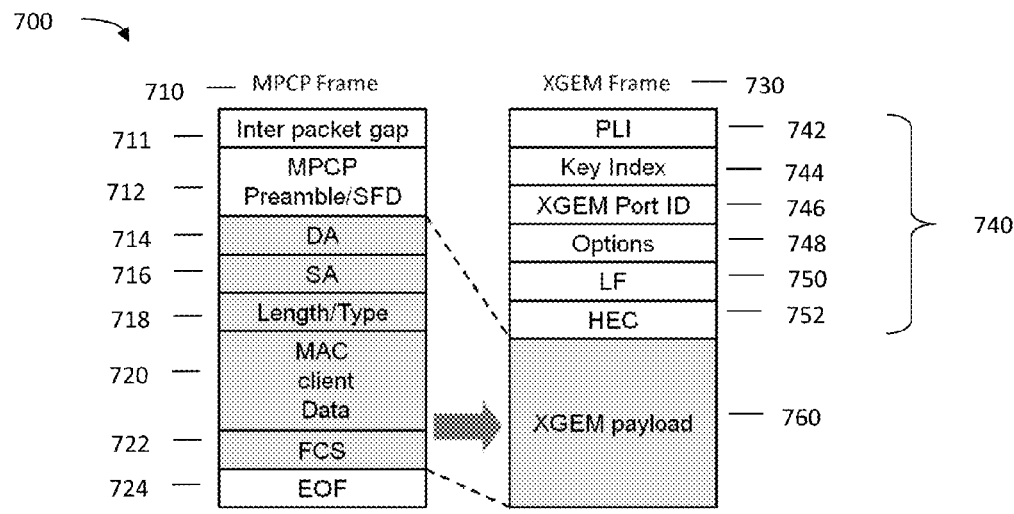
FIG. 7 illustrates an embodiment of a MPCP XGEM message.

FIG. 7 illustrates an embodiment of a MPCP XGEM message 700. An OLT (e.g. OLT 310) may communicate with a wireless or copper domain unit (e.g. CPE 350) via MPCP XGEM message 700. MPCP XGEM message 700 may comprise a MPCP frame 710 mapped into a payload 760 of an XGEM frame 730. MPCP frame 710 may be substantially similar to MPCP frame 410. Unlike MPCP XGEM message 500, MPCP XGEM message 700 may omit MPCP preamble/start-of-frame delimiter (SFD) field 712 from being mapped into XGEM frame 730.

Figure 8:
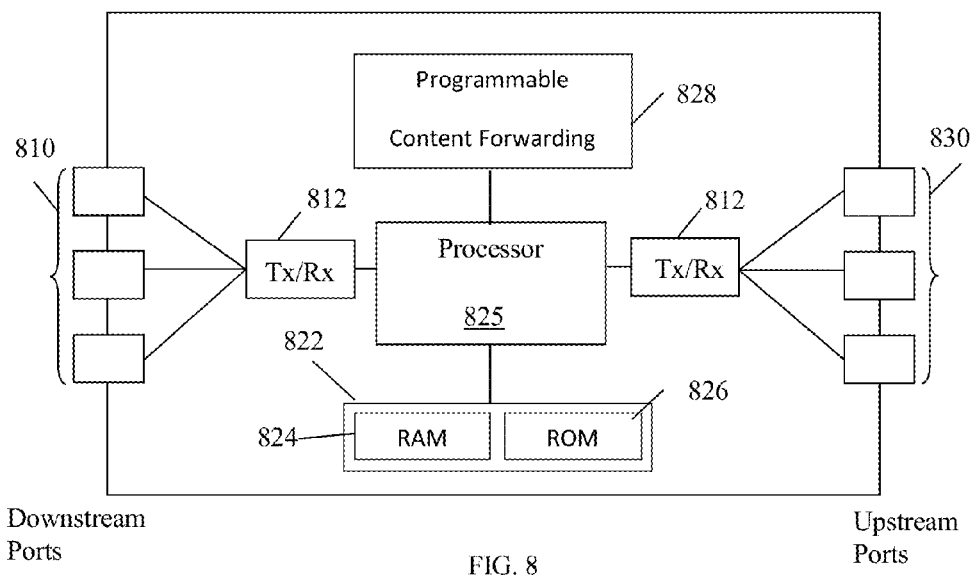
FIG. 8 illustrates an embodiment of a network element.

At least some of the features/methods described in the disclosure may be implemented in a network element. For instance, the features/methods of the disclosure may be implemented using hardware, firmware, and/or software installed to run on hardware. For example, the network element may be any device that transports data through a network, e.g., a switch, router, bridge, server, client, etc. FIG. 8 illustrates an embodiment of a network element 800, which may be any device that transports and processes data through a network. For instance, the network element 800 may be configured to handle MPCP GEM message 400 and MPCP XGEM message 500.

The network element 800 may comprise one or more ingress ports or faces 810 coupled to a transceiver (Tx/Rx) 812, which may be transmitters, receivers, or combinations thereof. A Tx/Rx 812 may be coupled to plurality of downstream ports 810 for transmitting and/or receiving frames from other nodes, a Tx/Rx 812 coupled to plurality of upstream ports 830 for transmitting and/or receiving frames from other nodes. A processor 825 may be coupled to the Tx/Rxs 812 to process the frames and/or determine the nodes to which to send frames. The processor 825 may comprise one or more multi-core processors and/or memory modules 822, which may function as data stores, buffers, etc. Processor 825 may be implemented as a general processor or may be part of one or more application specific integrated circuits (ASICs) and/or digital signal processors (DSPs). The downstream ports 810 and/or upstream ports 830 may contain electrical and/or optical transmitting and/or receiving components. Network element 800 may or may not be a routing component that makes routing decisions. The network element 800 may also comprise a programmable content forwarding plane block 828. The programmable content forwarding plane block 828 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the memory module 822. The programmable content forwarding plane block 828 may interpret user requests for content and accordingly fetch content, e.g., based on metadata and/or content name, from the network or other content routers and may store the content, e.g., temporarily, in the memory module 822. The programmable content forwarding plane block 828 may then forward the cached content to the user. The programmable content forwarding plane block 828 may be implemented using software, hardware, or both and may operate above the IP layer or layer 2 (L2) in the OSI model. The memory module 822 may comprise a cache 824 for temporarily storing content, e.g., a Random Access Memory (RAM). Additionally, the memory module 822 may comprise a long-term storage 826 for storing content relatively longer, e.g., a Read Only Memory (ROM). For instance, the cache 824 and the long-term storage 826 may include Dynamic random-access memories (DRAMs), solid-state drives (SSDs), hard disks, or combinations thereof. Notably, the storage blocks 822 may be used to house the instructions for carrying out the system and methods described herein.

It is understood that by programming and/or loading executable instructions onto the network element 800, at least one of the processors 825, the cache 824, and the long-term storage 826 are changed, transforming the network element 800 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, R1, and an upper limit, Ru, is disclosed, any number falling within the range is specifically disclosed. In particular, the following numbers within the range are specifically disclosed: $R=R1+k*(Ru-R1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical line terminal (OLT) comprising:
an optical port configured to couple to a plurality of network elements (NE) via an optical distribution network (ODN), wherein each NE intermediates between the OLT via the ODN and a plurality of customer premises equipments (CPEs) via an electrical distribution network (EDN), and wherein the CPEs comprise a first CPE and the NEs comprise a first NE positioned between the OLT and the first CPE; and
a processor coupled to the optical port, wherein the processor is configured to:
receive a plurality of first transmission requests from the NEs and a plurality of second transmission requests from the CPEs, wherein the first transmission requests do not originate from the CPEs;
calculate a transmission delay between the first CPE and the first NE;
allocate a first timeslot to each of the plurality of NEs for transmission on the ODN in response to the plurality of first transmission requests and the plurality of second transmission requests; and
allocate a second timeslot to each of the plurality of CPEs for transmission on the EDN in response to the plurality of first transmission requests and the plurality of second transmission requests.

2. The OLT of claim 1, wherein the processor is further configured to send to the NEs Multi-Point Control Protocol (MPCP) gate messages comprising information about the first timeslots.

3. The OLT of claim 1, wherein the OLT is connectable to a passive optical network (PON), wherein the NEs are optical network units (ONUs), and wherein the PON is a Gigabit-capable PON (GPON) or a 10 Gigabit-capable PON (XG-PON).

4. The OLT of claim 1, wherein the EDN is a copper distribution network or a wireless distribution network.

5. The OLT of claim 3, wherein the processor is further configured to send to the CPEs Multi-Point Control Protocol (MPCP) gate messages encapsulated in GPON encapsulation method (GEM) frames or XGPON encapsulation method (XGEM) frames.

6. The OLT of claim 5, further comprising:
a GEM port configured to send user data encapsulated in the GEM frames and the MPCP gate messages encapsulated in the GEM frames; and
an XGEM port configured to send user data encapsulated in the XGEM frames and the MPCP gate messages encapsulated in the XGEM frames.

7. The OLT of claim 1, wherein the processor is further configured to directly allocate the second timeslots to the CPEs without the NEs rescheduling CPE transmissions.

8. The OLT of claim 1, wherein the processor is further configured to compensate for the transmission delay when allocating the first timeslots.

9. The OLT of claim 8, wherein the processor is further configured to allocate the first timeslots for transmission of data from the CPEs, and wherein the first timeslots substantially coincide with arrival of the data at the NEs.

10. The OLT of claim 8, wherein the processor is further configured to allocate the first timeslots for transmission of data from the CPEs, and wherein the first timeslots do not coincide with arrival of the data at the NEs.

11. A network element (NE) comprising:
an electrical port configured to couple to a customer premises equipment (CPE) via an electrical distribution network (EDN);
an optical port configured to couple to an optical line terminal (OLT) via an optical distribution network (ODN); and
a processor coupled to the electrical port and the optical port, wherein the processor is configured to:
transmit to the CPE a timeslot for transmission on the EDN, wherein the timeslot is based on a transmission delay between the NE and the CPE;
receive from the CPE a plurality of data frames during the timeslot; and
forward the data frames to the OLT without rescheduling the data frames.

12. The NE of claim 11, wherein the processor is further configured to transmit the timeslot to the CPE in a Multi-Point Control Protocol (MPCP) gate message.

13. The NE of claim 12, wherein the OLT is connectable to a passive optical network (PON), wherein the PON is a Gigabit-capable PON (GPON) or a 10 Gigabit-capable PON (XG- PON), and wherein the processor is further configured to encapsulate the MPCP gate message in a GPON encapsulation method (GEM) frame or an XGPON encapsulation method (XGEM) frame.

14. The NE of claim 13, wherein the MPCP gate message comprises an MPCP preamble/start-of-frame delimiter field, a destination address field, a source address field, a length/type field, a Media Access Control (MAC) client data field, and a frame check sequence field, wherein the GEM frame comprises a GEM payload encapsulating the MPCP gate message.

15. The NE of claim 13, wherein the MPCP gate message comprises an MPCP preamble/start-of-frame delimiter field, a destination address field, a source address field, a length/type field, a MAC client data field, and a frame check sequence field, wherein the XGEM frame comprises a XGEM payload encapsulating the MPCP gate message.

16. A method implemented in a customer premises equipment (CPE), the method comprising:

sending a transmission request to an optical line terminal (OLT) via an intervening network element (NE) through an electrical distribution network (EDN), wherein the OLT is coupled to the NE through an optical distribution network (ODN), and wherein the NE is coupled to the EDN and intermediates between the EDN and the ODN;

receiving, from the OLT and in response to the transmission request, a timeslot for transmission, wherein the timeslot is based on a transmission delay between the NE and the CPE; and transmitting a plurality of data frames to the NE for forwarding to the OLT without rescheduling.

17. The method of claim 16, further comprising receiving the timeslot in a Multi-Point Control Protocol (MPCP) gate message.

18. The method of claim 17, further comprising receiving the MPCP gate message in a GPON encapsulation method (GEM) frame or an XGPON encapsulation method (XGEM) frame, wherein the MPCP gate message comprises a MPCP preamble/start-of-frame delimiter field, a destination address field, a source address field, a length/type field, a Media Access Control (MAC) client data field, and a frame check sequence field, wherein the GEM frame comprises a GEM payload, wherein the XGEM frame comprises a XGEM payload, and wherein the MPCP gate message is encapsulated in the GEM payload or the XGEM payload.

19. The method of claim 16, further comprising receiving the timeslot in a passive optical network (PON) bandwidth map (BWmap) or a Multi-Point Control Protocol (MPCP) gate message, wherein the PON BW map or the MPCP gate message is part of an Ethernet operations, administration, and management (OAM) frame.

* * * * *

UNITED STATES PATENT AND TRADEMARK OFFICE
CERTIFICATE OF CORRECTION

PATENT NO. : 9,184,847 B2  
APPLICATION NO. : 13/896323  
DATED : November 10, 2015  
INVENTOR(S) : Yuanqiu Luo et al.

It is certified that error appears in the above-identified patent and that said Letters Patent is hereby corrected as shown below:

On the Title Page:
Item (72) Inventors: Delete "Yuanqiu Luo, Canbury, NJ (US); Frank J. Effenberger, Colts Neck, NJ (US); Meng Sui, Shenzhen (CN)" and insert -- Yuanqiu Luo, Cranbury, NJ (US); Frank J. Effenberger, Colts Neck, NJ (US); Meng Sui, Shenzhen (CN) --

Signed and Sealed this  
Twelfth Day of April, 2016

Michelle K. Lee  
*Director of the United States Patent and Trademark Office*